United States Patent [19]

Wani et al.

[11] Patent Number: 5,134,273
[45] Date of Patent: Jul. 28, 1992

[54] CONTROL OF OUTPUT ENERGY OF A PULSED LIGHT SOURCE COMPRISING A GAS DISCHARGE LASER

[75] Inventors: Koichi Wani; Mutsumi Mimasu, both of Takatsuki; Tadaaki Miki, Osaka; Yasuhiro Shimada, Hirakata, all of Japan

[73] Assignee: Matsushita Electric Industrial Co., Ltd., Osaka, Japan

[21] Appl. No.: 583,940

[22] Filed: Sep. 18, 1990

[30] Foreign Application Priority Data

Mar. 27, 1990 [JP] Japan ................................. 2-77853

[51] Int. Cl.$^5$ ..................... G01J 1/32; B23K 26/04; H01J 3/13
[52] U.S. Cl. ............................. 250/205; 219/121.62; 372/31
[58] Field of Search .................... 250/205; 372/29, 30, 372/31; 219/121.61, 121.62

[56] References Cited

U.S. PATENT DOCUMENTS

| | | | |
|---|---|---|---|
| 4,700,057 | 10/1987 | Sakai | 250/205 |
| 4,701,609 | 10/1987 | Koishi et al. | 250/205 |
| 4,768,198 | 8/1988 | Deki | 372/31 |
| 4,814,596 | 3/1989 | Koizumi et al. | 250/205 |
| 4,837,787 | 6/1989 | Takesue et al. | 372/31 |
| 4,853,934 | 8/1989 | Sakurai | 250/205 |
| 4,879,459 | 11/1989 | Negishi | 250/205 |
| 4,894,524 | 1/1990 | Murase et al. | 250/205 |
| 5,025,447 | 6/1991 | Ohashi | 372/31 |
| 5,026,978 | 6/1991 | Misumi et al. | 250/205 |

*Primary Examiner*—David C. Nelms
*Assistant Examiner*—Michael Messinger
*Attorney, Agent, or Firm*—Lowe, Price, LeBlanc & Becker

[57] ABSTRACT

A pulsed light source comprising a laser for emitting light in pulse form in response to an electric power from a power supply which is changeable in accordance with a control signal from an external circuit and a photodetector responsive to the light from the laser so as to produce an electric signal corresponding to the intensity of the reception light. The output signal of the photodetector is supplied to a comparator so as to compare the electric signal therefrom with a reference signal to output a signal proportional to the difference between the electric signal and the reference signal. In response to the output signal of the comparator, a control circuit produces the control signal to be supplied to the power supply by adding the output signal of the comparator to a predetermined signal to control the electric power outputted from the power supply to the laser.

12 Claims, 6 Drawing Sheets

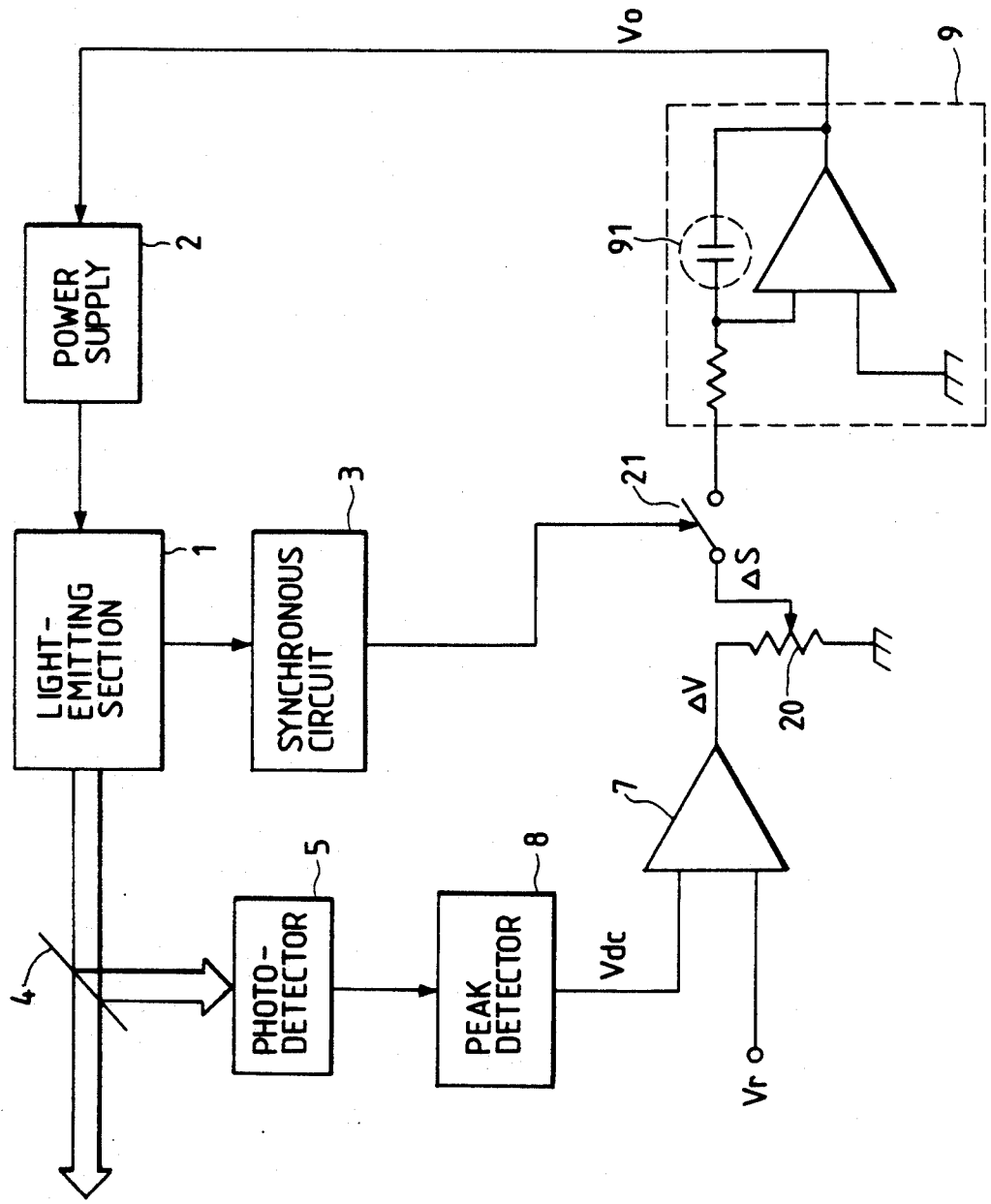

CONTROL OF OUTPUT ENERGY OF A PULSED LIGHT SOURCE COMPRISING A GAS DISCHARGE LASER

BACKGROUND OF THE INVENTION

The present invention relates to pulsed light sources such as a pulsed laser light generating apparatus, and more particularly to control of the output energy of such pulsed light sources.

Recently, laser apparatus having an oscillation frequency in the ultraviolet range have attracted attention as pulsed light sources for fine machining. Of these laser apparatus, an excimer laser can provide strong oscillation beams with several wavelengths in a range of 353 nm to 193 nm with halogen gas such as fluorine and chlorine being combined with noble gas such as krypton and xenon as the laser medium. This excimer laser is one of the pulsed lasers and is arranged such that the gas which is the laser medium is excited by quickly discharging charge in a capacitor or the like to produce laser light. Generally, the duration of the laser light is several times 10 nanoseconds and the oscillation repeatedly occurs with a period of several milliseconds to several times of 10 milliseconds. For using such an excimer laser light source, which is a pulsed light source, in fine machining fields, an important problem is to control the emission energy per one pulse to an adequate value. In cases where the energy per one pulse is below a given threshold, a material to be machined is not changed at all irrespective of continuous illumination of the laser light so that the machining effect does not appear. On the other hand, when the pulse energy exceeds a predetermined value, portions other than the light-receiving portion are undesirably subjected to deformation, decomposition and deterioration. Particularly, in the case of machining, with the lithography technique, pattern lines of a super LSI device or the like whose width is below 0.5 micrometers which is substantially equal to the wavelength of the light from the light source, it is required to set the pulse energy of the laser light to an optimal value. In addition, the excimer laser has a characteristic that the output energy is monotonously lowered with long-time operation because of deterioration of the gas which is the laser medium, and the efficiency varies for a relatively short time due to generation of impurities and others. This requires a means to keep the pulse intensity to a set value by adjusting the output voltage of a high voltage power supply at all times.

Conventionally, such a pulsed light source is generally arranged such that the apparent pulse strength becomes constant by keeping the average output to a constant value, as disclosed in U.S. Pat. No. 4,611,270. A conventional pulsed light source will be described hereinbelow with reference to FIG. 1. In FIG. 1, a light-emitting section (pulsed laser) 1 intermittently emits light in response to supply of an electric energy from a power supply 2. A portion of light emitted from the light-emitting section 1 is derived through a half mirror or beam splitter 4 and then led to a light-receiving element (photodetector) 5. The light-receiving element 5 produces an electric signal corresponding to the intensity of the incident light thereon and supplies it through an averaging circuit 6 to a comparator 7. The comparator 7 compares a reference value Vr with the value of a signal corresponding to the laser output time-averaged in the averaging circuit 6 so as to control the power supply 2 in accordance with the difference therebetween. Secondly, operation of the conventional pulsed light source will be described hereinbelow with reference to FIG. 2. In FIG. 2, first, the light-emitting section 1 oscillates with a constant period as illustrated. When the efficiency of the light-emitting section 1 is lowered at time T1 so that the pulse energy P which is its output becomes lowered, the average output Pa also decreases, and hence the comparator 7 increases the power supply voltage V so that the difference $\Delta V$ between the average output Pa and the reference value Vr becomes zero, thus thereby keeping the average value of the pulse energy P to a constant value.

However, such a conventional pulsed light source has a disadvantage in that difficulty is encountered in keeping the pulse energy at a constant value irrespective of variation of the light-emitting interval. In the actual machining, there is the possibility that a rest time in which the light-emission is stopped is made and the light-emitting period is changed in accordance with the nature of a material. In the case illustrated in FIG. 2, after time t2, the light-emission is intermittently effected with the rest time being made. When the rest time is made, the average output decreases, and therefore, the comparator operates to compensate therefor whereby the pulse strength immediately after the rest time becomes great. In the other case illustrated in FIG. 2 wherein the light-emitting period becomes longer after t3, since the average output is lowered the comparator operates so that the pulse energy becomes great. Particularly, in the case of using such a pulsed light source in a step-and-repeat type semiconductor circuit lithography apparatus, it is required to frequently change the light-emitting period. Thus, the conventional system causes generation of substandard products because of being difficult to keep constant the pulse energy. Moreover, the conventional control system is arranged to compensate for the output lowering due to relatively long time operation and generally arranged such that the time constant of the averaging circuit takes on the order of several seconds. When the time constant of the averaging circuit is set to be smaller, such problems do not occur. In such a case, however, a fluctuation of pulse energy is amplified, because the output energy of the excimer laser varies at every emission. Thus, in the case of the above-mentioned excimer laser with output variation on the order of several seconds, it is difficult with the conventional control method to maintain the output sufficiently constant.

SUMMARY OF THE INVENTION

It is therefore an object of the present invention to provide a pulsed light source which is controllable with high response and stability.

In accordance with the present invention, there is provided a pulsed light source including: light-emitting means for emitting light in pulse form and a power supply means for supplying an electric power to the light-emitting means. The magnitude of the electric power is changeable in response to a control signal. The invention further includes light-receiving means responsive to light from the light-emitting means, for producing an electric signal corresponding to the intensity of the reception light. A comparator means is coupled to the light-receiving means so as to compare the electric signal therefrom with a reference signal. The comparator means output a signal proportional to the difference between the electric signal and the reference signal. A control means is responsive to the output signal of the comparator means so as to produce the control signal, which is supplied to the power supply means to control the electric power outputted from the power supply means to the light-emitting means.

Preferably, the comparator means and the control means are coupled through switching means to each other whereby the output signal of the comparator means is connected and disconnected with respect to the control means. The switching means is arranged to take a closed state for a predetermined time period in synchronism with the emission of the light-emitting means. Moreover, the output signal of the comparator means is amplified with a gain which is below 1 and the control means produces the control signal in accordance with the amplified signal. The gain of the comparator means is variable in accordance with variation of the light emitted from the light-emitting means.

In accordance with the present invention, there is further provided a pulsed light source including a light-emitting means for emitting light in pulse form a power supply means for supplying an electric power to the light-emitting means. The power supply means is controllable in accordance with a digital control signal. The invention further includes light-receiving means responsive to the light emitted from the light-emitting means for generating an electric signal corresponding to the intensity of the reception light therefrom. A comparator means is coupled to the light-receiving means so as to compare the output signal of the light-receiving means with a reference signal to output a signal corresponding to the difference therebetween. A control means is coupled to the comparator means to digitize the output signal of the comparator means and add the digitized signal to a predetermined digital signal, thereby producing the digital control signal to be supplied to the power supply means.

BRIEF DESCRIPTION OF THE DRAWINGS

The object and features of the present invention will become more readily apparent from the following detailed description of the preferred embodiments taken in conjunction with the accompanying drawings in which:

FIG. 3 is a block diagram showing a pulsed light source according to a first embodiment of the present invention;

DETAILED DESCRIPTION OF THE INVENTION

Figure 1:
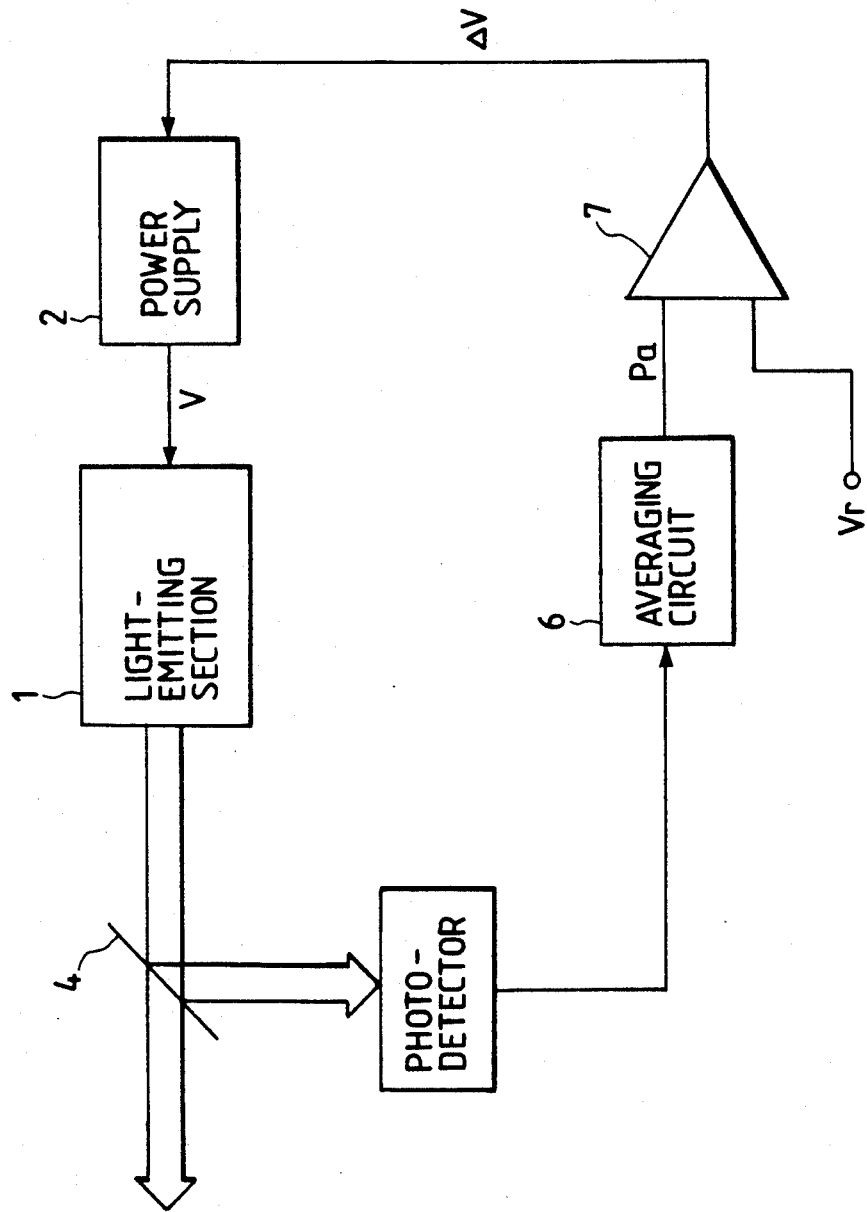
FIG. 1 is a block diagram showing a conventional pulsed light source.
Figure 2:
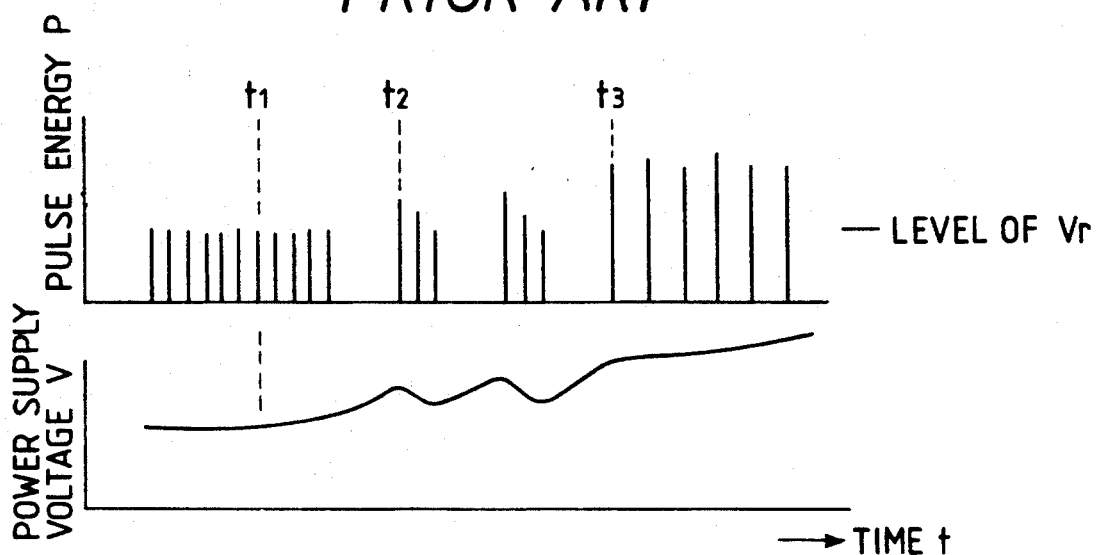
FIG. 2 is a graphic illustration for describing the FIG. 1 conventional pulsed light source.

Referring now to FIG. 3, there is illustrated a pulsed light source according a first embodiment of the present invention. In FIG. 3, the pulsed light source includes a light-emitting section (laser) 1 which outputs light in a pulse form in response to supply of a power from a high voltage power supply 2. A portion of the output light of the light-emitting section 1 is derived through a beam splitter 4 and received by means of a photodetector 5. The photodetector 5 generates an electric signal corresponding to the energy of the reception light and outputs it to a peak detector 8. The output of the peak detector 8 is supplied to a comparator 7 which compares the output voltage of the peak detector 8 with a predetermined reference value Vr so as to generate a difference signal $\Delta V$ in accordance with the comparison result, i.e., in correspondance with the difference therebetween. The output signal of the comparator 7 is led to a divider 20 so as to regulate the difference signal $\Delta V$ to a small signal $\Delta s$ which is proportional thereto. The output signal $\Delta s$ of the divider 20 is led through switch 21 to an integrating circuit 9. The switch 21 is arranged to be closed by means of a synchronous circuit 3 for a predetermined time period ts after each emission by the light-emitting section 1. The integrating circuit 9 adds the samll signal $\Delta s$ to its output voltage V0. The power supply 2 supplies the light-emitting section 1 with a voltage V which is proportional to the output voltage V0 of the integrating circuit 9.

Let it be assumed that the pulse energy P starts to decrease while the light-emitting section 1 continuously operates to emit light in a pulse form. In response to a portion of the output light of the light-emitting section 1, the photodetector 5 generates a voltage signal proportional to the energy of the reception light therefrom. Because the emitted light has a pulse form, if the voltage signal is compared with the reference voltage Vr which is a direct-current voltage signal, a great error occurs during a time in which the light-emitting section 1 does not emit the light. Thus, in this embodiment, the peak detector 8 holds the voltage proportional to the reception pulse energy of the photodetector 5 until the next pulse emission of the light-emitting section 1 and produces a direct-current signal Vdc corresponding thereto. The comparator 7 compares the direct-current signal Vdc with the reference signal Vr to output the difference signal $\Delta V = Vr - Vdc$. The integrating circuit 9 generates the signal V0 by charge stored in a capacitor 91. The small signal $\Delta s$ produced by dividing the difference signal $\Delta V$ by means of the divider 20 is added to the voltage of the capacitor 91 only for a predetermined time ts, whereby the output voltage V of the power supply 2 varies in the direction that the pulse output returns to a predetermined value.

For example, in cases where the light-emitting section 1 is a pulsed laser such as an excimer laser, the energy of the output light varies at every emission. If the light-emitting section 1 has such a characteristic, the divider 20 prevents amplification of the variation by the energy control. That is, the comparator 7 requires that the output voltage of the power supply 2 is increased by $\Delta V1$ at the time of the next emission. However, where the output of the light-emitting section 1 fluctuates, even if the output voltage of the power supply 2 is increased by $\Delta V1$, the output energy does not necessarily become a predetermined value. According to experiments by the inventors, the increase of the output voltage of the power supply 2 instead causes the output fluctuation to become greater. In this case, when the output voltage is increased by $\Delta V1 \times n$ through the divider 20 where n is a number below 1, the fluctuation of the output energy scarcely increases. As a result of employing such a control method, emissions whose number is several times to several 10 times are required to return the output energy to a predetermined value. In the case of a pulsed laser such as an excimer laser, since the emissions of several times of 10 times per second are repeatedly performed, it is general that the output returns to the predetermined value within about 1 second.

Into the capacitor 91 is introduced charge proportional to an amount obtained by multiplying the small signal $\Delta s$ by a time ts for which the switch 21 is in the closed condition. If the switch 21 is not provided, the time ts is equal to the period of the emission. At this time, since the charge additionally introduced into the capacitor 91 is not only proportional to the difference signal but also proportional to the emission period, when the emission interval varies, the controlled amount varies in accordance with the emission period. If the time ts is kept constant through the switch 21, it is possible to control the energy to a constant value irrespective of the emission period.

Figure 4:
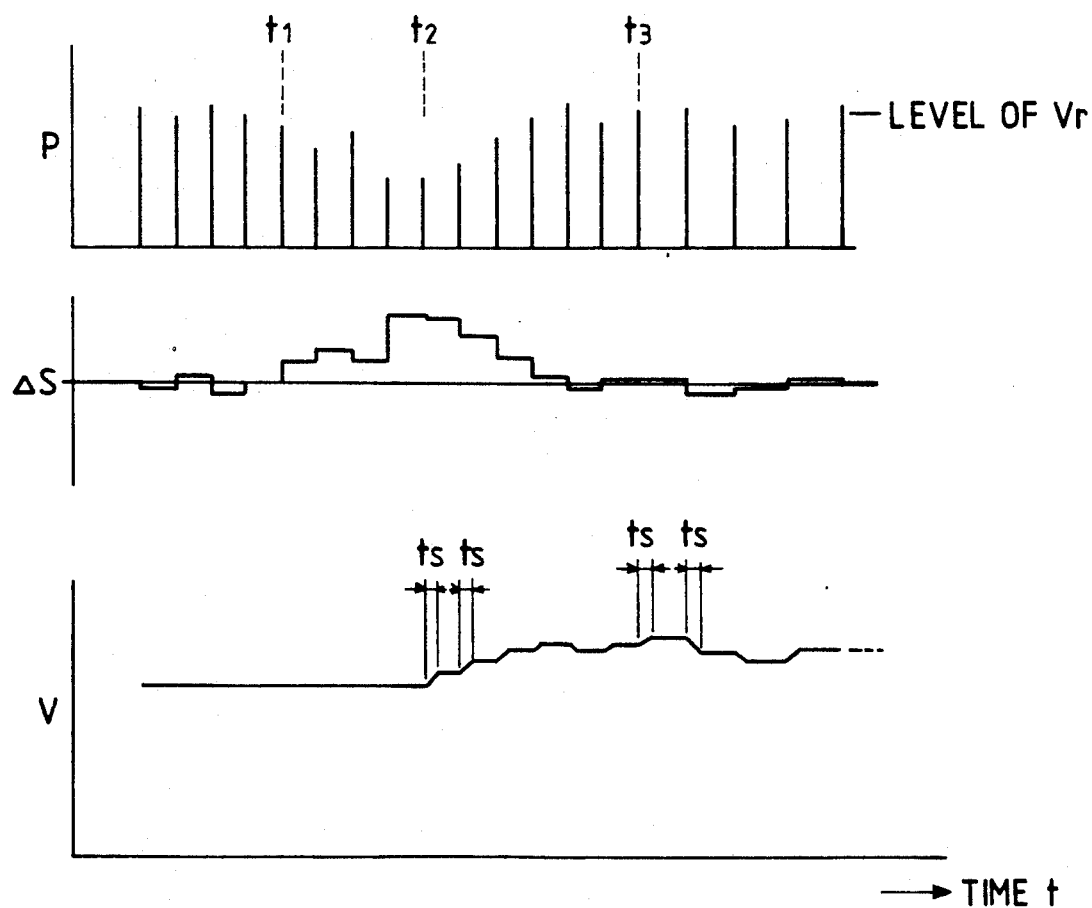
FIG. 4 is a graphic illustration for describing the operation of the FIG. 3 pulsed light source.

The energy control will be described hereinbelow with reference to FIG. 4. In FIG. 4, let it be assumed that the efficiency of the light-emitting section 1 starts to decrease from time t1 and, in order to clearly show the effect of this invention, the control to make the energy constant is not performed until time t2 whereby the pulse energy varies and the average value thereof decreases in accordance with the decrease in the efficiency. After time t2, the pulse energy control is started. Thus, the comparator 7 compares the reference signal Vr with the direct-current signal Vdc proportional to the pulse energy immediately before the time t2 so as to output the small signal $\Delta s$ to the integrating circuit 9. The integrating circuit 9 controls the power supply 2 so that the difference can be cancelled, that is, if the small signal $\Delta s$ is positive, the output voltage V of the power supply 2 is controlled to be increased, and if $\Delta s$ is negative, V is decreased. Therefore, at the time of the next emission, the pulse energy approaches the predetermined value. Thereafter, the pulse strength is controlled to direct to the predetermined value at every emission and therefore the average value of the pulse energies directs to a predetermined value. In FIG. 4, the emission period is shortened from time t3. However, due to the operation of the switch 21, the time ts for which the small signal $\Delta s$ is supplied to the integrating circuit 9 is independent of the emission period, and therefore the pulse energy can be kept constant as well as before time t3.

Although in this embodiment the peak value of the pulse strength is held, it is also appropriate to hold the integrated value of the pulse waveform. Further, it is appropriate to use a sample and hold circuit, which is a general IC circuit, instead of the peak detector 8. In addition, the divider 20 is not necessarily provided independently, and it is also appropriate to reduce the gain of the peak detector 8 or the comparator 7. Moreover, the synchronous circuit 3 is not limited to the description. It is also appropriate to detect the emission in conjunction with the power supply 2, the light-emitting section 1 and the photodetector 5.

Figure 5:
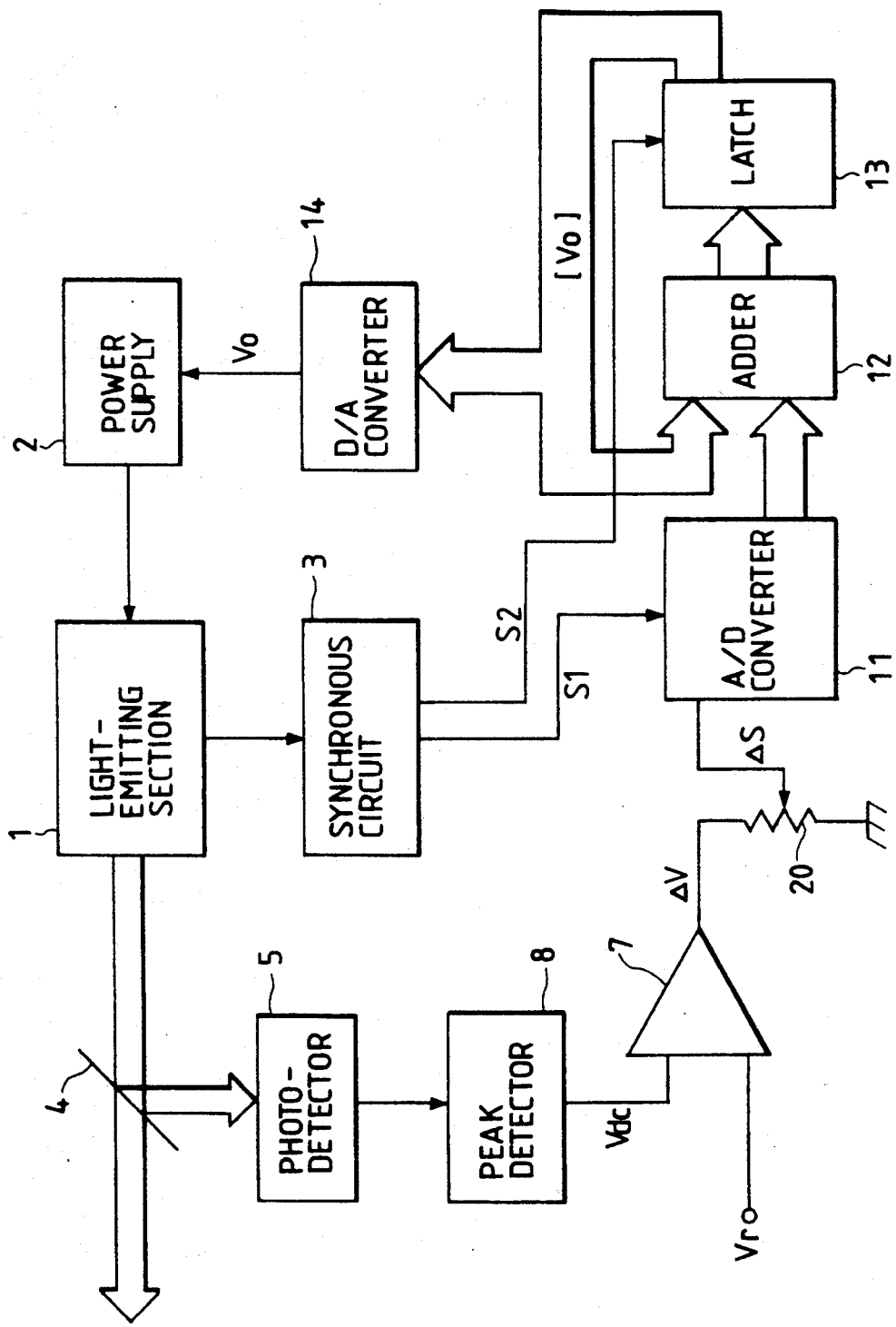
FIG. 5 is a block diagram showing a pulsed light source according to a second embodiment of this invention.

A second embodiment of this invention will be described hereinbelow with reference to FIG. 5. In FIG. 5, a pulsed light source of this embodiment similarly includes a light-emitting section (laser) 1 which outputs light in a pulse form in response to supply of a power from a high voltage power supply 2. A portion of the output light of the light-emitting section 1 is derived through a beam splitter 4 and received by means of a photodetector 5. The photodetector 5 generates an electric signal corresponding to the energy of the reception light and outputs it to a peak detector 8. The output of the peak detector 8 is supplied to a comparator 7 which compares the output voltage of the peak detector 8 with a predetermined reference value Vr so as to generate a difference signal $\Delta V$ in accordance with the comparison result, i.e., in correspondance with the difference therebetween. The output signal of the comparator 7 is led to a divider 20 so as to regulate the difference signal $\Delta V$ to a small signal $\Delta s$ which is proportional thereto. The output signal $\Delta s$ of the divider 20 is led to an analog-to-digital (A/D) converter 11 the output of which is supplied to an adder 12 so as to take the sum of the output of the A/D converter 11 and a voltage [V0] for setting the output of the power supply 2. The sum signal is led to a latch 13. Here, the voltage [V0] is a digital voltage obtained by the analog-to-digital conversion of the voltage V0. The output of the latch 13 is supplied to a digital-to-analog converter (D/A) 14 so as to become an output setting voltage V0. The operation timings of the A/D converter 11 and the latch 13 are determined in accordance with signals from the synchronous circuit 3.

Let it be assumed that the pulse energy P starts to decrease while the light-emitting section 1 continuously operates to emit light in a pulse form. In response to a portion of the output light of the light-emitting section 1, the photodetector 5 generates a voltage signal proportional to the energy of the reception light therefrom. Because the emitted light has a pulse form, if the voltage signal is compared with the reference voltage Vr which is a direct-current voltage signal, a great error occurs during a time in which the light-emitting section 1 does not emit the light. Thus, in this embodiment, the peak detector 8 holds the voltage proportional to the reception pulse energy of the photodetector 5 until the next pulse emission of the light-emitting section 1 and produces a direct-current signal Vdc corresponding thereto. The comparator 7 compares the direct-current signal Vdc with the reference signal Vr to output the difference signal $\Delta V = Vr - Vdc$. The divider 20 divides the difference signal $\Delta V$ so as to produce the small signal $\Delta s$. The small signal $\Delta s$ is converted in the A/D converter 11 into a digital signal and then added to the previous output setting voltage [V0] so as to produce a signal $[V0] + [\Delta s]$ which is in turn supplied to the latch 13. The latch 13 rewrites the contents from [V0] to $[V0] + [\Delta s]$ at every emission, whereby the output voltage of the power supply 2 is regulated in accordance with the deviation of the previous emission energy at the time of the next emission. Thus, the synchronous circuit (trigger circuit) 3 supplies the A/D converter 11 with a delay signal s1 synchronous with the termination of the emission and further supplies the latch 13 with a delay signal s2 synchronous with the termination of the analog-to-digital conversion, so that a timing is made so as to reflect a deviation signal to the next output setting voltage V0.

For example, in cases where the light-emitting section 1 is a pulsed laser, such as an excimer laser, the energy of the output light varies at every emission as described in the first embodiment. If the light-emitting section 1 has such a characteristic, the divider 20 prevents amplification of the variation by the energy control. That is, the comparator 7 requires that the output voltage of the power supply 2 is increased by $\Delta V1$ at the time of the next emission. However, if the output of the light-emitting section 1 fluctuates, even if the output voltage of the power supply 2 is increased by ΔV1, the output energy does not necessarily become a predetermined value. According to experiments by the inventors, the increase of the output voltage of the power supply 2 instead causes the output fluctuation to become greater. In this case, when the output voltage is increased by ΔV1×n through the divider 20 where n is a number below 1, the fluctuation of the output energy scarcely increases. As a result of employing such a control method, emissions whose number is several times to several 10 times are required to return the output energy to a predetermined value. In the case of a pulsed laser such as an excimer laser, since the emissions of several times of 10 times per second are repeatedly performed, it is general that the output returns to the predetermined value within about 1 second.

The A/D converter 11 functions so as to keep the pulse energy constant irrespective of variation of the emission period of the light-emitting section 1. That is, the adder 12 adds the small signal Δs to the output setting voltage V0 only one time at every emission, whereby the controlled amount of the output voltage of the power supply 2 becomes constant irrespective of the emission period. Further, in cases where the output setting voltage V0 is held in an analog form by means of a capacitor or the like, when the emission is stopped for a long time, the voltage V0 decreases due to discharging of the capacitor and hence it beomes impossible to obtain a desirable pulse energy at the time of re-start of the emission. However, according to this embodiment, since the output setting voltage V0 is digitized and then held in the latch 13, it is possible to keep the output voltage of the power supply 2 to the previous set value irrespective of the long-time interruption of emission. Namely, the pulse energy at the time of the re-start of the emission takes a desirable value.

Figure 6:
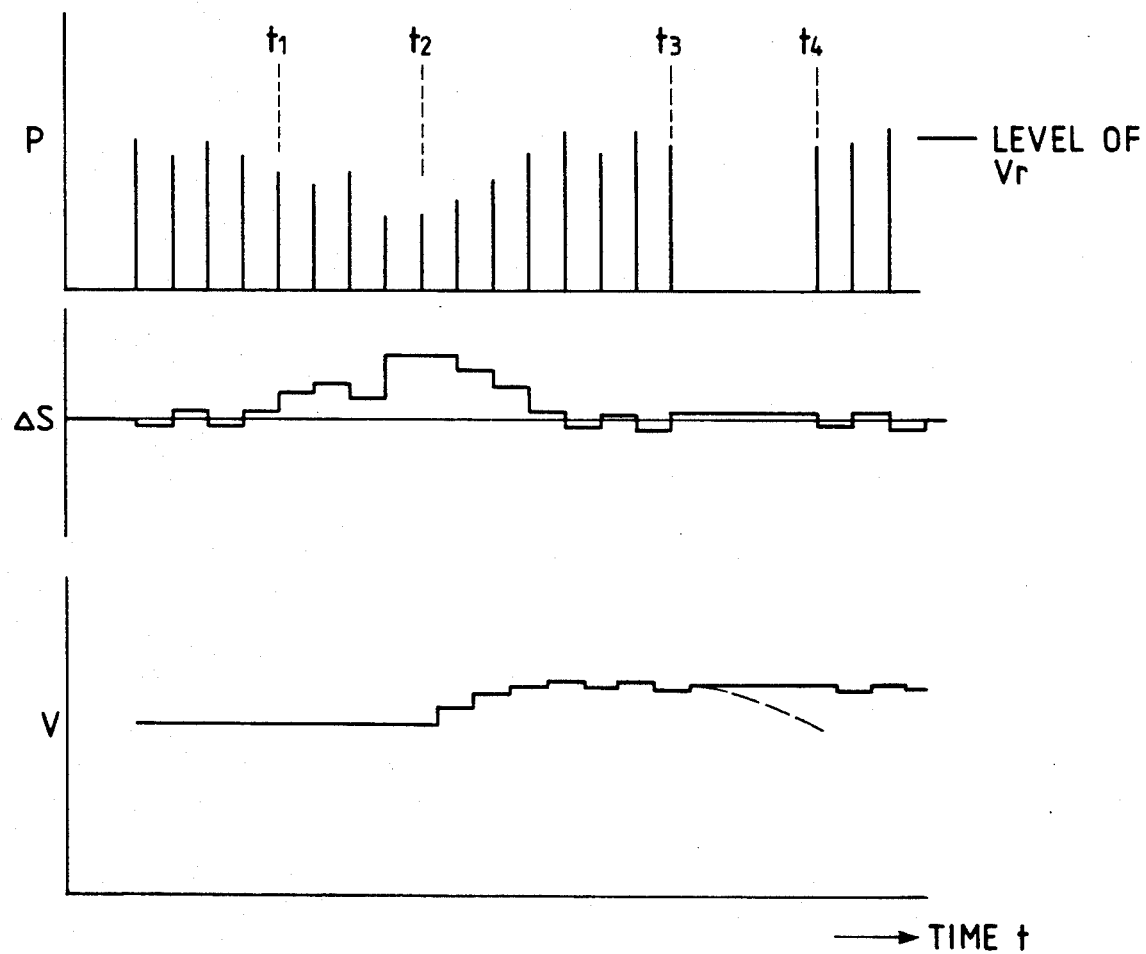
FIG. 6 is a graphic illustration for describing the operation of the FIG. 5 pulsed light source.

The energy control of this embodiment will be described hereinbelow with reference to FIG. 6. In FIG. 6, let it be assumed that the efficiency of the light-emitting section 1 starts to decrease from time t1 and, in order to clearly show the effect of this invention, the control to make the energy constant is not performed until time t2 whereby the pulse energy varies and the average value thereof decreases in accordance with the decrease in the efficiency. After time t2, the pulse energy control is started. Thus, the comparator 7 compares the reference signal Vr with the direct-current signal Vdc proportional to the pulse energy immediately before the time t2 and the adder 12 controls the power supply 2 so that the difference can be cancelled, that is, if the signal Δs is positive, the output voltage V of the power supply 2 is controlled to be increased, and if Δs is negative, V is decreased. Therefore, at the time of the next emission, the pulse energy approaches the predetermined value. Thereafter, the pulse strength is controlled to direct to the predetermined value at every emission and therefore the average value of the pulse energies directs to a predetermined value. In FIG. 6, the emission is stopped for a period from time t3 to time t4. Since the output control signal V0 is kept by the latch 13 to be constant, when the emission is re-started, the desirable value can be attained from the initial pulse. In FIG. 6, a broken line shows that the power supply voltage V decreases during the stoppage in the case that the output control signal is held in an analog form by means of a capacitor or the like.

Although in this embodiment the peak value of the pulse strength is held, it is also appropriate to hold the integrated value of the pulse waveform. Further, it is appropriate to use a sample and hold circuit, which is a general IC circuit, instead of the peak detector 8. In addition, the divider 20 is not necessarily provided independently, and it is also appropriate to reduce the gain of the peak detector 8 or the comparator 7. Moreover, the synchronous circuit 3 is not limited to the description. It is also appropriate to detect the emission in conjunction with the power supply 2, the light-emitting section 1 and the photodetector 5 so as to produce the delay signals s1 and s2.

According to this embodiment, the pulsed light source can keep the pulse strength constant irrespective of the emission period, the emission stoppage and others.

Figure 7:
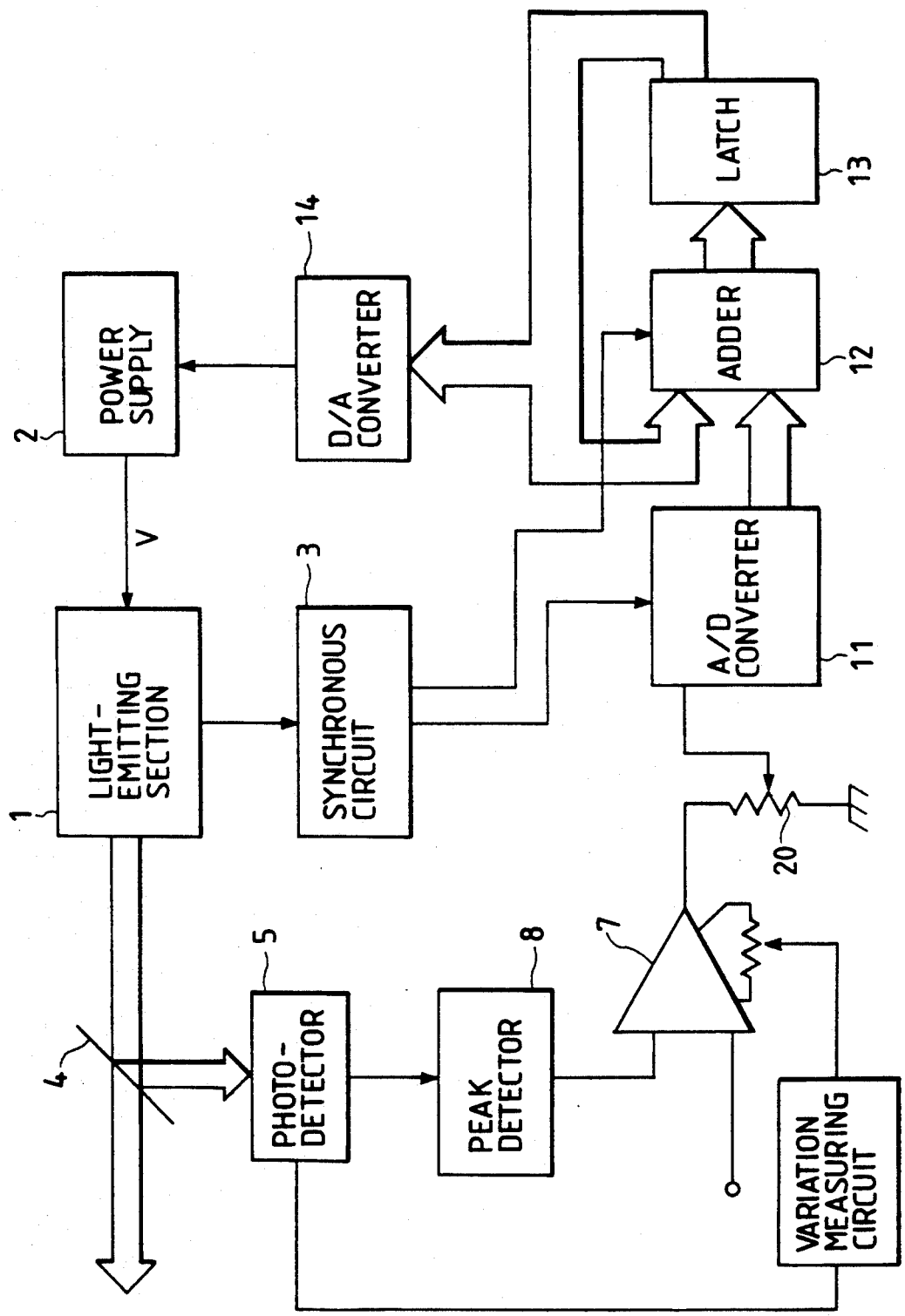
FIG. 7 is a block diagram showing a pulsed light source according to a third embodiment of this invention.

A third embodiment of this invention will be described hereinbelow with reference to FIG. 7. In FIG. 7, a pulsed light source of this embodiment similarly includes a light-emitting section (laser) 1 which outputs light in a pulse form in response to supply of a power from a high voltage power supply 2. A portion of the output light of the light-emitting section 1 is derived through a beam splitter 4 and received by means of a photodetector 5. The photodetector 5 generates an electric signal corresponding to the energy of the reception light and outputs it to a peak detector 8. The output of the peak detector 8 is supplied to a comparator 7 which compares the output voltage of the peak detector 8 with a predetermined reference value Vr so as to generate a difference signal ΔV in accordance with the comparison result, i.e., in correspondance with the difference therebetween. The gain of the comparator 7 is controlled by the variation-measuring circuit 30, which is connected to the photodetector 5. The output signal of the comparator 7 is led to a divider 20 so as to regulate the difference signal ΔV to a small signal Δs which is proportional thereto. The output signal Δs of the divider 20 is led to an analog-to-digital (A/D) converter 11 the output of which is supplied to an adder 12 so as to take the sum of the output of the A/D converter 11 and a voltage [V0] for setting the output of the power supply 2. The sum signal is led to a latch 13. Here, the voltage [V0] is a digital voltage obtained by the analog-to-digital conversion of the voltage V0. The output of the latch 13 is supplied to a digital-to-analog converter (D/A) 14 so as to become an output setting voltage V0. The operation timings of the A/D converter 11 and the latch 13 are determined in accordance with signals from the synchronous circuit 3.

Let it be assumed that the pulse energy P starts to decrease while the light-emitting section 1 continuously operates to emit light in a pulse form. In response to a portion of the output light of the light-emitting section 1, the photodetector 5 generates a voltage signal proportional to the energy of the reception light therefrom. As described in the description of the first and second embodiments, because the emitted light has a pulse form, if the voltage signal is compared with the reference voltage Vr which is a direct-current voltage signal, a great error occurs during a time in which the light-emitting section 1 does not emit the light. Thus, in this embodiment, the peak detector 8 holds the voltage proportional to the reception pulse energy of the photodetector 5 until the next pulse emission of the light-emitting section 1 and produces a direct-current signal Vdc corresponding thereto. The comparator 7 compares the direct-current signal Vdc with the reference signal Vr to output the difference signal $\Delta V = Vr - Vdc$.

The gain of the comparator 7 is variable and, in accordance with the output of a variation measuring circuit 30, the gain is set to be small when the variation of the output pulse energy of the light-emitting section 1 is great and on the other hand the gain is set to be great when the variation thereof is small. The divider 20 divides the difference signal $\Delta V$ so as to produce the small signal $\Delta s$. The small signal $\Delta s$ is converted in the A/D converter 11 into a digital signal and then added to the previous output setting voltage [V0] so as to produce a signal [V0]+[$\Delta s$] which is in turn supplied to the latch 13. The latch 13 rewrites the contents from [V0] to [V0]+[$\Delta s$] at every emission, whereby the output voltage of the power supply 2 is regulated in accordance with the deviation of the previous emission energy at the time of the next emission. Thus, the synchronous circuit (trigger circuit) 3 supplies the A/D converter 11 with a delay signal s1 synchronous with the termination of the emission and further supplies the latch 13 with a delay signal s2 synchronous with the termination of the analog-to-digital conversion, so that a timing is made so as to reflect a deviation signal to the next output setting voltage V0.

For example, in cases where the light-emitting section 1 is a pulsed laser such as an excimer laser, the energy of the output light varies at every emission. If the light-emitting section 1 has such a characteristic, the divider 20 and the variation measuring circuit 30 together prevent amplification of the variation by the energy control. That is, let it be assumed that the comparator 7 requires that the output voltage of the power supply 2 is increased by $\Delta V1$ at the time of the next emission. However, if the output of the light-emitting section 1 fluctuates, even if the output voltage of the power supply 2 is increased by $\Delta V1$, the output energy does not necessarily become a predetermined value. According to experiments by the inventors, the increase of the output voltage of the power supply 2 instead causes the output fluctuation to become greater. In this case, when the output voltage is increased by $\Delta V1 \times n$ through the comparator 7 and the divider 20, the variation of the output energy scarcely increases. Here, the character n is a number below 1 and is set to be small when the output energy variation is great and set to be great when the output energy variation is small, thereby allowing the output energy to be kept constant without increasing the fluctuation of the output energy. As a result of employing such a control method, emissions whose number is several times to several 10 times are required to return the output energy to a predetermined value. In the case of a pulsed laser such as an excimer laser, since the emissions of at least several times of 10 times per second are repeatedly performed, the output returns to the predetermined value within about 1 second, and the time required therefor is independent on the output variation.

The A/D converter 11 functions so as to keep the pulse energy constant irrespective of variation of the emission period of the light-emitting section 1. That is, the adder 12 adds the samll signal $\Delta s$ to the output setting voltage V0 only one time at every emission in response to the delay signal s2, whereby the controlled amount of the output voltage of the power supply 2 becomes constant irrespective of the emission period. Further, in cases where the output setting voltage V0 is held in an analog form by means of a capacitor or the like, when the emission is stopped for a long time, the voltage V0 decreases due to discharging of the capacitor and hence it beomes impossible to obtain a desirable pulse energy at the time of re-start of the emission. However, according to this embodiment, since the output setting voltage V0 is digitized and then held in the latch 13, it is possible to keep the output voltage of the power supply 2 to the previous set value irrespective of the long-time interruption of emission. Namely, the pulse energy at the time of the re-start of the emission takes a desirable value.

Although in this embodiment the peak value of the pulse strength is held, it is also appropriate to hold the integrated value of the pulse waveform. Further, it is appropriate to use a sample and hold circuit, which is a general IC circuit, instead of the peak detector 8. In addition, the divider 20 is not necessarily provided independently, and it is also appropriate to reduce the gain of the peak detector 8 or the comparator 7. Moreover, the synchronous circuit 3 is not limited to the description. It is also appropriate to detect the emission in conjunction with the power supply 2, the light-emitting section 1 and the photodetector 5 so as to produce the delay signals s1 and s2.

According to this embodiment, the pulsed light source can keep the pulse strength constant irrespective of the emission period, the emission stoppage and others.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention.

What is claimed is:

1. A pulsed light source comprising:
   light emitting means comprising a gas discharge laser emitting light in pulse form;
   power supply means for supplying an electric power to said light-emitting means, the magnitude of the electric power being changeable in response to a control signal;
   light-receiving means responsive to light from said light-emitting means so as to produce an electric signal corresponding to the intensity of the reception light; and
   comparator means, a gain of which is below unity and variable, coupled to said light-receiving means so as to compare the electric signal therefrom with a reference signal to output a signal proportional to the difference between the electric signal and the reference signal; and
   control means responsive to the output signal of said comparator means so as to produce the control signal, which is supplied to said power supply means to control the electric power outputted from said power supply means to said light-emitting means.

2. A pulsed light source as claimed in claim 1, wherein said comparator means and said control means are coupled through switching means to each other whereby the output signal of said comparator means is connected and disconnected with respect to said control means.

3. A pulsed light source as claimed in claim 2, wherein said switching means is arranged to take a closed state for a predetermined time period in synchronism with the pulsed emission of said light-emitting means.

4. A pulsed light source as claimed in claim 1, wherein the gain of said comparator means is variable in accordance with variation of the light emitted from said light-emitting means.

5. A pulsed light source as claimed in claim 1, wherein the control means comprise:
   means responsive to operation of said light emitting means to provide a signal in synchronism with the pulsed emitted light;
   means, responsive to the signal in synchronism with the pulsed emitted light, for adding a current value proportional to the output signal of said comparator to a previous value of the control signal for each pulse emission by the light emitting means.

6. A pulsed light source as claimed in claim 5, wherein the means for adding a current value of the output signal of said comparator comprise:
   an analog integrator circuit; and
   a switch means, driven by the signal in synchronism with the pulsed emitted light, to couple a signal proportional to the output signal of said comparator to an input of said analog integrator circuit for a predetermined time period for each emission of light.

7. A pulsed light source as claimed in claim 5, wherein the means for adding comprise:
   an analog to digital converter responsive to a signal proportional to the output of said comparator circuit;
   a digital adder having two inputs, wherein one of the inputs receives digital values from the analog to digital converter; and
   a latch coupled to the output of the adder for holding the an output value, the output of the latch providing the second input said digital adder,
   wherein operation of said analog to digital converter, said digital adder and said latch are driven by the signal in synchronism with the pulsed emitted light such that the adder adds the current digital value proportional to the output signal of said comparator to a previous value of the control signal held by said latch means.

8. A pulsed light source as claimed in claim 1, wherein the gas discharge laser comprises an excimer laser.

9. A pulsed light source comprising:
   light-emitting means comprising a gas discharge laser emitting light in pulse form;
   power supply means for supplying an electric power to said light-emitting means, said power supply means being controllable in accordance with a digital control signal;
   light-receiving means responsive to the light emitted from said light-emitting means so as to generate an electric signal corresponding to the intensity of the reception light therefrom;
   comparator means, a gain of which is below unity and variable, coupled to said light-receiving means so as to compare the output signal of said light-receiving means with a reference signal to output a signal corresponding to the difference therebetween; and
   control means coupled to said comparator means to digitize the output signal of said comparator means and add the digitized signal to a predetermined digital signal, thereby producing the digital control signal to be supplied to said power supply means.

10. A pulsed light source as claimed in claim 9, wherein said control means performs the digitization and addition one time in synchronism with each pulsed light emission due to said light-emitting means.

11. A pulsed light source as claimed in claim 9, wherein the gain of said comparator means is changeable in accordance with variation of the light emitted from said light-emitting means.

12. A pulsed light source as claimed in claim 9, wherein the gas discharge laser comprises an excimer laser.

* * * * *